US 6,691,642 B2

(12) United States Patent
Dollahan

(10) Patent No.: US 6,691,642 B2
(45) Date of Patent: Feb. 17, 2004

(54) FEED TROUGH

(76) Inventor: Meredith S. Dollahan, 520 E. 625 North, North Judson, IN (US) 46366

( * ) Notice: Subject to any disclaimer, the term of this patent is extended or adjusted under 35 U.S.C. 154(b) by 32 days.

(21) Appl. No.: 10/064,242

(22) Filed: Jun. 25, 2002

(65) Prior Publication Data

US 2002/0195060 A1 Dec. 26, 2002

Related U.S. Application Data

(60) Provisional application No. 60/300,669, filed on Jun. 25, 2001.

(51) Int. Cl.$^7$ .................. A01K 1/10; A01K 39/00; A01K 5/00
(52) U.S. Cl. .................................. 119/58; 119/61
(58) Field of Search ............... 119/58, 61, 52.1, 119/51.01, 60

(56) References Cited

U.S. PATENT DOCUMENTS

| | | | | |
|---|---|---|---|---|
| 5,000,122 A | * | 3/1991 | Smith | 119/58 |
| 5,092,273 A | * | 3/1992 | Meyer | 119/52.4 |
| 5,158,040 A | * | 10/1992 | Martin | 119/58 |
| 5,178,096 A | * | 1/1993 | Lock | 119/58 |
| 5,345,895 A | * | 9/1994 | Stevens et al. | 119/58 |
| 5,386,800 A | * | 2/1995 | Pirok | 119/58 |

* cited by examiner

*Primary Examiner*—Peter M. Poon
*Assistant Examiner*—Judith A. Nelson

(57) ABSTRACT

A hay feed trough whose construction and materials render the trough more resistant to weather, as well as provides improved retention of fodder to reduce waste. The feed trough includes a support frame having longitudinal members oriented in a longitudinal direction of the trough and transverse members oriented in a transverse direction of the trough, a bin supported by and within the support frame and adapted for containing hay or other fodder material, and a one-piece platform that is removably supported beneath the bin for detachably supporting the platform from at least one of the support frame and bin. The platform is molded from a weather-resistant polymeric material, and is formed to have a sectioned configuration that provides features for supporting the platform, promoting hay retention on the platform, and separating the platform into multiple smaller platforms.

20 Claims, 2 Drawing Sheets

FEED TROUGH

CROSS REFERENCE TO RELATED APPLICATIONS

This application claims the benefit of U.S. Provisional Application No. 60/300,669, filed Jun. 25, 2001.

BACKGROUND OF INVENTION

1. Field of the Invention

The present invention generally relates to feed troughs, and more particularly to hay troughs of the type used for cattle and horses.

2. Description of the Related Art

Hay feed troughs for cattle and horses typically include a bin formed by a grating, into which hay or another plant fodder is placed. Cattle and horses are able to reach through the grating or otherwise pull hay from the bin through the grating. An elevated flat metal platform or tray is usually provided beneath the bin so that hay falling from the bin or dropped by an animal will not fall to the ground, thereby reducing waste and allowing animals to feed directly from the platform. A problem with the metal platform is poor corrosion resistance when exposed to the weather elements year round, necessitating replacement of the platform at intervals of at times only several years.

From the above, it can be seen that an improved, more weather-resistant feed trough would be desirable.

SUMMARY OF INVENTION

The present invention provides a hay feed trough whose construction and materials render the trough more resistant to weather, as well as provides improved retention of fodder to reduce waste. The feed trough includes a support frame having longitudinal members oriented in a longitudinal direction of the trough and transverse members oriented in a transverse direction of the trough, a bin supported by and within the support frame and adapted for containing hay or other fodder material, and a one-piece platform or tray that is removably supported beneath the bin with means for detachably supporting the platform from at least one of the support frame and bin. The platform is preferably molded from a weather-resistant polymeric material, and is formed to have a sectioned configuration that provides features for supporting the platform and promoting hay retention on the platform. The sectioned configuration of the platform defines a plurality of recesses delineated by transverse and longitudinal raised portions at which the platform can be separated into multiple smaller platforms for installation on a smaller feed trough.

The present invention also provides a method for assembling the fodder feed trough by supporting the bin by and within the support frame, and removably suspending the platform beneath the bin by detachably supporting the platform from at least one of the support frame and bin. The method encompasses separating the platform along at least one of the transverse and longitudinal raised portions to form multiple smaller platforms.

In view of the above, the one-piece platform can be formed of a material that is more resistant to weather than metal platforms used in conventional fodder feed troughs, and has molded raised portions that provide improved retention of fodder. These molded raised portions also provide features by which the platform can be supported beneath the bin, as well as define sections along which a larger molded body can be separated to form multiple platforms.

Other objects and advantages of this invention will be better appreciated from the following detailed description.

DETAILED DESCRIPTION

Figure 1:
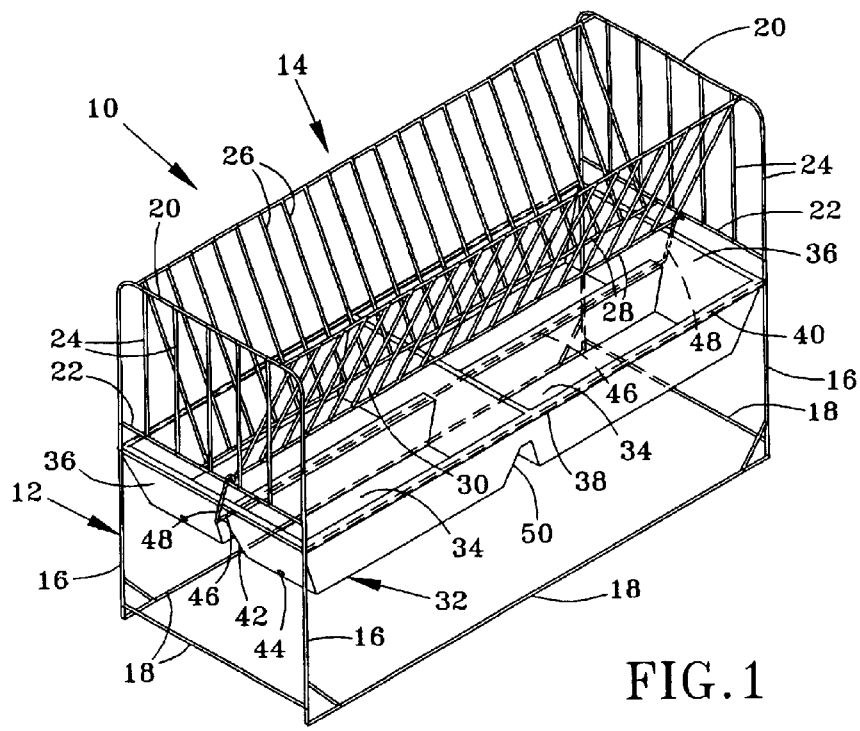
FIGS. 1 and 2 show perspective and end views, respectively, of a feed trough in accordance with a preferred embodiment of this invention.
Figure 2:
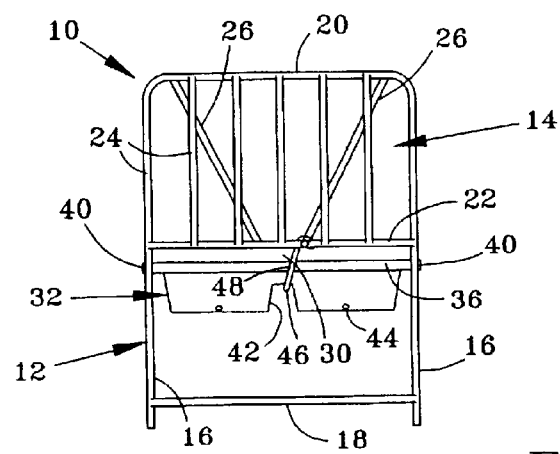

FIGS. 1 and 2 represent a hay feed trough 10 in accordance with a preferred embodiment of this invention. The feed trough 10 comprises a support frame 12 from which a V-shaped bin 14 is supported above the ground. The support frame 12 is shown as comprising four upright support legs 16 that are interconnected near their lower ends by four horizontal base bars 18, interconnected near their upper ends by four horizontal upper bars 20, and interconnected at their midportions by four horizontal midportion bars 22. Two of each of the base bars 18, upper bars 20 and midportion bars 22 extend in the longitudinal direction of the feed trough 10, while the remaining two of the base bars 18, upper bars 20 and midportion bars 22 are oriented in a transverse direction of the trough 10. Finally, five vertical bars 24 are shown interconnecting each adjacent pair of the transverse upper and midportion bars 20 and 22 of the support frame 12. With certain limitations that will become apparent from the following discussion, other configurations for the support frame 12 are possible.

The bin 14 is shown as being oriented in the longitudinal direction of the trough 10, and having a generally conventional grate construction comprising two rows of parallel bin bars 26 that are inclined relative to each other to provide the V-shape of the bin 14. The bin bars 26 within each row are spaced sufficiently apart to allow cattle and horses to reach through the gaps between adjacent bars. The upper end of each bin bar 26 is welded or otherwise secured to one of the two longitudinal upper bars 20 of the support frame 12. The lower end of each bin bar 26 is welded or otherwise secured to one of two longitudinal median bars 28 that are welded or otherwise secured to the two transverse midportion bars 22 of the support frame 12. The longitudinal median bars 28 are parallel and horizontally spaced apart from each other, forming a gap 30 therebetween that extends longitudinally along the bottom of the V-shaped bin 14.

Figure 3:
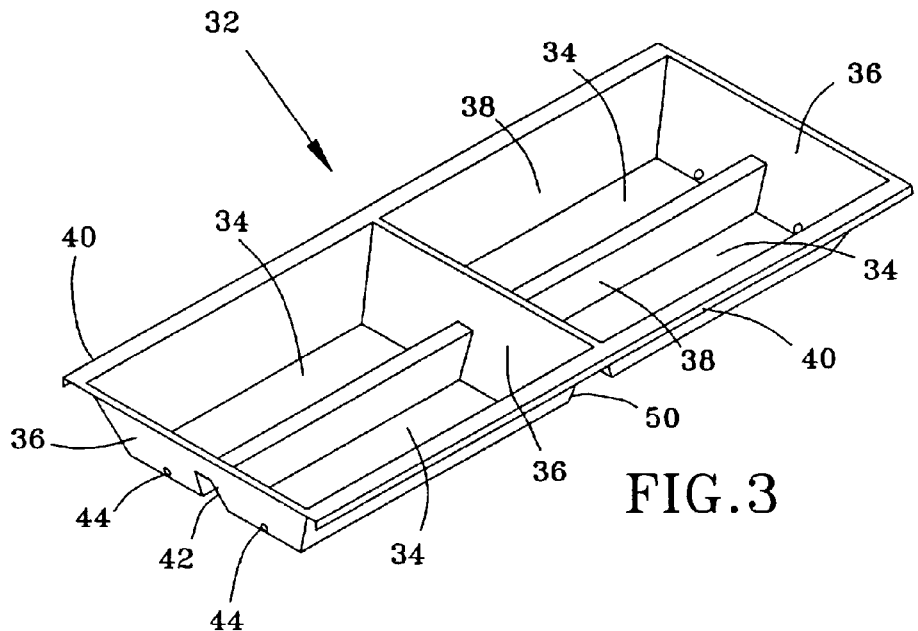
FIGS. 3 and 4 show, respectively, a feed tray for the feed trough of FIGS. 1 and 2 and a feed tray for a smaller feed trough in accordance with this invention.

Finally, the feed trough 10 comprises a tray 32 that catches the hay (or other fodder) that falls from the bin 14. The tray 32 is shown as being formed of a one-piece polymer material that is preferably resistant to weathering by moisture and the sun. While various materials could be used, a particularly suitable resistant material is believed to be polyethylene, a suitable example of which is available from QuickMarkQuickMarkExxonMobil. As best seen from FIG. 3, in which the tray 32 is shown separately from the support frame 12 and bin 14, the tray 32 can be seen to comprise four cavities 34 delineated by three parallel transverse raised portions 36 and three parallel longitudinal raised portions 38. The two outer longitudinal raised portions 38 are shaped to define an outwardly-projecting rim 40, while the middle longitudinal raised portion 38 is defined by two wall portions to define a longitudinal recess 42 beneath the tray 32 that extends the full length of the tray 32. The three transverse raised portions 36 and the two outer longitudinal raised portions 38 are shown as being at a higher elevation than the middle longitudinal raised portion 38. As best seen in FIG. 3, each cavity 34 is equipped with a drain hole 44 for draining rain water.

As seen from FIGS. 1 and 2, the tray 32 is supported beneath the bin 14 by nesting the two longitudinal midportion bars 22 with the outwardly-projecting rims of the two outer longitudinal raised portions 38 of the tray 32, and with a center support rod 46 that is suspended beneath the bin 14 and nested in the longitudinal recess 42 of the tray 32. The middle longitudinal raised portion 38 of the tray 32 is seen disposed directly beneath the longitudinal gap 30 at the lower end of the bin 14. As seen in FIGS. 1 and 2, the center support rod 46 is hung with hooks 48 from one or both of the two longitudinal median bars 28 at the lower end of the bin 14. In this manner, releasing the hooks 48 allows the center support rod 46 to be removed, which in turn allows removal of the tray 32.

Figure 4:
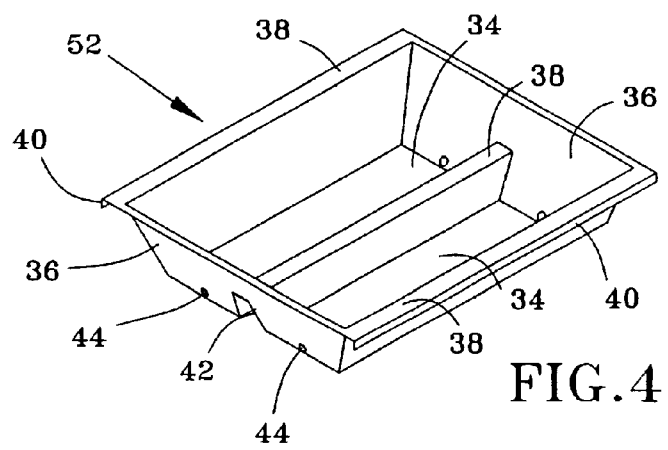

Finally, FIG. 4 shows how the tray 32 of FIGS. 1 through 3 can be sectioned to form two smaller trays 52 (only one is shown) for a smaller hay trough. Sectioning is done by simply cutting along the middle transverse raised portion 36 of the tray 32 which, in a manner similar to the middle longitudinal raised portion 38 of the tray 32, is defined by two wall portions to define a transverse recess 50 beneath the tray 32 that extends the full width of the tray 32. Each smaller tray 52 has two of the four cavities 34 of the original tray 32. In view of this one-piece configuration in which multiple recesses 34 are delineated by multiple transverse and longitudinal raised portions 36 and 38, multiple trays 32 and 52 can be formed by sectioning a single larger molded body.

While the invention has been described in terms of a preferred embodiment, it is apparent that other forms could be adopted by one skilled in the art. For example, the physical configuration of the trough 10 could differ from that shown, and materials and processes other than those noted could be use. Therefore, the scope of the invention is to be limited only by the following claims.

What is claimed is:

1. A fodder feed trough comprising:
   a support frame having longitudinal members oriented in a longitudinal direction of the trough and transverse members oriented in a transverse direction of the trough;
   a bin supported by and within the support frame;
   a one-piece platform removably suspended beneath the bin, the platform having a sectioned configuration that defines a plurality of recesses delineated by transverse and longitudinal raised portions, the transverse and longitudinal raised portions defining features at which the platform can be separated into multiple smaller platforms for installation on a smaller feed trough; and
   means for detachably supporting the platform from at least one of the support frame and bin.

2. A fodder feed trough according to claim 1, wherein the bin is oriented in the longitudinal direction of the trough.

3. A fodder feed trough according to claim 2, wherein the bin has a V-shaped cross-section in the transverse direction of the trough.

4. A fodder feed trough according to claim 3, wherein the bin defines a gap at a lower end of the V-shaped cross-section thereof.

5. A fodder feed trough according to claim 1, wherein the longitudinal raised portions of the platform comprise two outer longitudinal raised portions and a center longitudinal raised portion, the outer longitudinal raised portions defining outer longitudinal rim portions of the platform, the center longitudinal raised portion defining a longitudinal recess in a lower surface of the platform.

6. A fodder feed trough according to claim 5, wherein the support means comprises a support rod nested in the longitudinal recess in the lower surface of the platform, and means for suspending the support rod from at least one of the support frame and bin.

7. A fodder feed trough according to claim 6, wherein the suspending means comprises hooks that fasten the support rod to the bin.

8. A fodder feed trough according to claim 6, wherein the support means further comprises the outer longitudinal rim portions of the platform and the longitudinal members of the support frame, the outer longitudinal rim portions being supported on the longitudinal members.

9. A fodder feed trough according to claim 5, wherein the support means comprises the outer longitudinal rim portions of the platform and the longitudinal members of the support frame, the outer longitudinal rim portions being supported on the longitudinal members.

10. A fodder feed trough according to claim 1, wherein the platform is formed of a molded polymeric material.

11. A method for providing a fodder feed trough, the method comprising the steps of:
    providing a support frame having longitudinal members oriented in a longitudinal direction of the trough and transverse members oriented in a transverse direction of the trough;
    supporting a bin by and within the support frame; and
    removably suspending a one-piece platform beneath the bin by detachably supporting the platform from at least one of the support frame and bin, the platform having a sectioned configuration that defines a plurality of recesses delineated by transverse and longitudinal raised portions, the transverse and longitudinal raised portions defining features at which the platform can be separated into multiple smaller platforms for installation on a smaller feed trough.

12. A method according to claim 11, wherein the bin is supported so as to be oriented in the longitudinal direction of the trough.

13. A method according to claim 12, further comprising the step of forming the bin to have a V-shaped cross-section in the transverse direction of the trough.

14. A method according to claim 13, further comprising the step of forming the bin to have a gap at a lower end of the V-shaped cross-section thereof.

15. A method according to claim 11, further comprising the step of forming the platform so that the longitudinal raised portions thereof comprise two outer longitudinal raised portions and a center longitudinal raised portion, the outer longitudinal raised portions define outer longitudinal rim portions of the platform, and the center longitudinal raised portion defines a longitudinal recess in a lower surface of the platform.

16. A method according to claim 15, wherein the platform is detachably supported with a support rod nested in the longitudinal recess in the lower surface of the platform, and the support rod is suspended from at least one of the support frame and bin.

17. A method according to claim 16, wherein the support rod is suspended with hooks fastened to the bin.

18. A method according to claim 16, wherein the platform is detachably supported by supporting the outer longitudinal rim portions of the platform on the longitudinal members of the support frame.

19. A method according to claim 15, wherein the platform is detachably supported by supporting the outer longitudinal rim portions of the platform on the longitudinal members of the support frame.

20. A method according to claim 11, wherein the platform is formed by molding a polymeric body to have a plurality of the recesses delineated by a plurality of the transverse and longitudinal raised portions, and then separating the body along at least one of the transverse and longitudinal raised portions to form the platform and at least a second platform.

* * * * *